(12) United States Patent
Scrivano (10) Patent No.: US 11,681,659 B2
(45) Date of Patent: Jun. 20, 2023

(54) HYBRID FILE COMPRESSION MODEL

(71) Applicant: RED HAT, INC., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/326,876

(22) Filed: May 21, 2021

(65) Prior Publication Data
US 2022/0374395 A1    Nov. 24, 2022

(51) Int. Cl.
*G06F 16/174* (2019.01)

(52) U.S. Cl.
CPC ............................... *G06F 16/1744* (2019.01)

(58) Field of Classification Search
CPC .................................................. G06F 16/1744
See application file for complete search history.

(56) References Cited

U.S. PATENT DOCUMENTS

| 5,813,011 | A * | 9/1998 | Yoshida | G06F 3/0608 |
| 6,633,674 | B1 * | 10/2003 | Barnes | H04N 19/156 |
| | | | | 375/E7.199 |
| 6,828,925 | B2 * | 12/2004 | McCanne | H03M 7/30 |
| | | | | 341/51 |
| 6,885,395 | B1 * | 4/2005 | Rabbani | H04N 1/2112 |
| | | | | 348/231.1 |
| 7,477,166 | B2 * | 1/2009 | McCanne | H03M 7/30 |
| | | | | 707/999.102 |
| 7,987,162 | B2 * | 7/2011 | Aston | G06F 3/0689 |
| | | | | 707/823 |
| 8,117,173 | B2 * | 2/2012 | Gurevich | G06F 16/182 |
| | | | | 707/693 |
| 8,392,798 | B2 * | 3/2013 | Flynn | G06F 16/9014 |
| | | | | 714/763 |
| 8,463,759 | B2 * | 6/2013 | Johnson | H03M 7/46 |
| | | | | 707/693 |
| 8,572,054 | B2 * | 10/2013 | Oh | H03M 7/30 |
| | | | | 707/693 |

(Continued)

FOREIGN PATENT DOCUMENTS

CN           112104725 A        12/2020

OTHER PUBLICATIONS

Huang, B. "Deduplication in Container Image Storage System: Model and Cost-Optimization Analysis," pp. 6.

(Continued)

*Primary Examiner* — Anhtai V Tran
*Assistant Examiner* — Huen Wong
(74) *Attorney, Agent, or Firm* — Womble Bond Dickinson (US) LLP (57) ABSTRACT

An archive file that includes an archive start point and an archive end point is received to be segmented and compressed. A first set of compression start points to segment the archive file according to a first function and a second set of compression start points to partition the archive file according to a second function are created. The first set of compression start points and the second set of compression start points are combined to create a set of merged compression start points to partition the archive file into portions between the archive start point and the archive end point. Each portion between the archive start point and the archive end point are compressed to create a compressed archive file.

15 Claims, 5 Drawing Sheets

(56) References Cited

U.S. PATENT DOCUMENTS

| | | | |
|---|---|---|---|
| 9,306,988 B2* | 4/2016 | Barton | G06F 16/1748 |
| 9,367,557 B1* | 6/2016 | Lin | G06F 16/1744 |
| 9,483,579 B2* | 11/2016 | Marquess | H04L 69/22 |
| 9,547,774 B2* | 1/2017 | Bestler | G06F 3/067 |
| 10,102,057 B2 | 10/2018 | Karamanolis et al. | |
| 10,120,893 B1* | 11/2018 | Rocamora | G06N 20/00 |
| 10,216,754 B1* | 2/2019 | Douglis | G06F 16/1744 |
| 10,411,896 B2 | 9/2019 | Bouterse et al. | |
| 10,732,951 B2 | 8/2020 | Jayanthi | |
| 10,936,412 B1 | 3/2021 | Visvanathan et al. | |
| 11,061,867 B2* | 7/2021 | Natanzon | G06F 16/116 |
| 2005/0235043 A1* | 10/2005 | Teodosiu | H04L 69/04 709/217 |
| 2006/0047855 A1* | 3/2006 | Gurevich | G06F 16/182 707/E17.005 |
| 2006/0085561 A1* | 4/2006 | Manasse | G06F 16/174 707/E17.005 |
| 2006/0136365 A1* | 6/2006 | Kedem | G06F 3/0608 |
| 2007/0208893 A1* | 9/2007 | Azzarello | G06F 16/1744 710/68 |
| 2008/0152235 A1* | 6/2008 | Bashyam | H03M 7/4018 382/224 |
| 2009/0144565 A1* | 6/2009 | Peterson | H03M 7/30 713/193 |
| 2009/0307250 A1* | 12/2009 | Koifman | G06F 21/62 |
| 2010/0027882 A1* | 2/2010 | Matsuoka | H04N 1/642 382/166 |
| 2010/0039942 A1* | 2/2010 | Nakatsuji | H04W 28/06 370/477 |
| 2010/0179963 A1* | 7/2010 | Conner | G01C 21/32 707/769 |
| 2010/0185690 A1* | 7/2010 | Evans | G06F 16/113 711/E12.001 |
| 2010/0277353 A1* | 11/2010 | Shalev | H03M 7/30 341/94 |
| 2010/0281004 A1* | 11/2010 | Kapoor | G06F 16/1744 707/693 |
| 2011/0099351 A1* | 4/2011 | Condict | G06F 3/0641 711/216 |
| 2011/0219144 A1* | 9/2011 | Amit | G06F 16/00 709/247 |
| 2011/0219186 A1* | 9/2011 | Amit | G06F 3/0671 711/117 |
| 2012/0089579 A1* | 4/2012 | Ranade | G06F 16/183 707/693 |
| 2012/0162243 A1* | 6/2012 | Matsuo | H04N 5/272 345/592 |
| 2012/0166401 A1* | 6/2012 | Li | G06F 16/2255 707/E17.005 |
| 2015/0088811 A1* | 3/2015 | Hase | G06F 16/1805 707/607 |
| 2015/0269180 A1* | 9/2015 | Chen | H03M 7/3066 707/693 |
| 2016/0132268 A1* | 5/2016 | Koifman | G06F 12/1408 711/170 |
| 2016/0259591 A1* | 9/2016 | Arikawa | G06F 3/0608 |
| 2018/0333646 A1* | 11/2018 | Daly, Jr. | H04L 69/04 |
| 2019/0147047 A1* | 5/2019 | Chen | G06F 16/188 707/692 |
| 2019/0149695 A1* | 5/2019 | Kamada | H04N 1/40062 358/471 |
| 2019/0251190 A1 | 8/2019 | Scrivano | |
| 2019/0335233 A1* | 10/2019 | Harvey | H04N 21/4405 |
| 2020/0042219 A1* | 2/2020 | Wang | G06F 3/0683 |
| 2020/0042220 A1* | 2/2020 | Armangau | G06F 3/0604 |
| 2020/0226102 A1* | 7/2020 | Natanzon | G06F 16/1744 |
| 2020/0233659 A1* | 7/2020 | Kim | G06F 8/658 |
| 2021/0144226 A1* | 5/2021 | De Icaza Amozurrutia | G06F 16/183 |
| 2021/0232500 A1* | 7/2021 | Butt | G06F 12/0253 |

OTHER PUBLICATIONS

Meister, D. (Feb. 2-13). "File Recipe Compression in Data Deduplication Systems." Johannes Gutenberg Universitat, pp. 14.

* cited by examiner

HYBRID FILE COMPRESSION MODEL

TECHNICAL FIELD

Aspects of the present disclosure relate to file compression, and more particularly, segmenting and compressing archive files.

BACKGROUND

Containers are lightweight mechanisms for isolating running processes and generally interact only with their respective designated resources. Containers can be used to ensure consistency across multiple development environments. For example, software applications may be packaged into container images that include collections of objects and metadata. An image is a binary that includes all of the requirements for running a container, as well as metadata describing its needs and capabilities. These files allow the image to be run as a standalone application in a container. A container image is made up of multiple image layers, each image layer including data files in forms such as packages, scripts, libraries, settings, etc. The contents of each image layer can be stored locally (e.g., a local cache) or in a compressed format in a particular storage location, or both.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

When not executing, a container is a file (or set of files) that is saved on a storage device. The container file may be referred to as a container image or container repository. A container is the runtime instantiation of the container image. The container image is a file which is accessed from a registry server and used locally as a mount point when starting containers. In some embodiments, the container image is a container repository that includes multiple container image layers and metadata that may be stored in an archive file. A container engine, upon receiving a start command, may access and unpack or decompress the container image layers and metadata from the registry server for use by an operating system kernel.

Conventional computing systems may segment the image file layers of the container images within an archive file for storage and later retrieval, sometimes in short term storage locally in a compressed or decompressed form, or in a persistent storage in a compressed form, locally or on a network. The conventional computer system may receive a request for the container image and may access one or more of the compressed container images layers that may be missing from local memory.

A file-objects-storage algorithm may segment and compress each archive file of a container image layer into pieces corresponding to a system block size and file boundaries, which allows for accessing the container images locally. However, each file of the archive file has to pass a checksum operation separately to ensure data integrity. A rolling checksum algorithm to segment and compress the original archive file in multiple segments without regard to file boundaries and system block size, which allows for storing and accessing the compressed image files from network storage, but is unusable for access in a local system configured to use system block sizes. Depending on which technique is used, the compression algorithm may be aware of the method used to segment the archive, which may create compatibility issues.

The file-objects-storage algorithm creates strain on compute, access and storage resources of the conventional computing system when minor modifications have been made to one or more container image layers that causes the conventional computing system to access one or more storage locations and to process more compressed container image layer data. The rolling checksum algorithm may also create a similar strain to resources in addition to compatibility issues from producing unusable blocks for a local system configured to use system block sizes, decreasing the performance of the conventional computing system.

Aspects of the disclosure address the above-noted and other deficiencies by utilizing a hybrid multi-function algorithm to segment and compress image file layers. In an embodiment, files of a container image layer are in an archive file. Processing logic of a processing device may receive the archive file that includes an archive start point and an archive end point. The processing logic may create a first set of compression start points to segment the archive file according to a first function and a second set of compression start points to partition the archive file according to a second function. For example, the first function may provide for efficient local storage access and decompression and the second function more efficient access from network storage.

The processing logic may combine the first set of compression start points and the second set of compression start points to create a set of merged compression start points. The merged compression start points may be used by the processing logic to partition the archive file into portions between the archive start point and the archive end point. In an embodiment, the processing logic may receive the merged compression start points defining each archive file portion and compress each portion between the archive start point and the archive end point to create a compressed archive file.

In embodiments the processing logic may, for each compressed portion, generate a digest that may include, among other things, metadata corresponding to an offset associated with each merged start point. The processing logic, in response to a request for a container image layer, may detect one or more missing portions of the archive file and retrieve those missing portions of the archive file from the compressed archive file based on the digest. The processing logic may add the retrieved one or more missing portions of the archive to a memory for future access.

By utilizing of a multi-function algorithm to segment and compress image file layers, according to embodiments, access time and resources required to access image file layers may be reduced, thus lowering system execution latency, excessive storage and memory access, and provide improved performance of the computer system.

Figure 1:
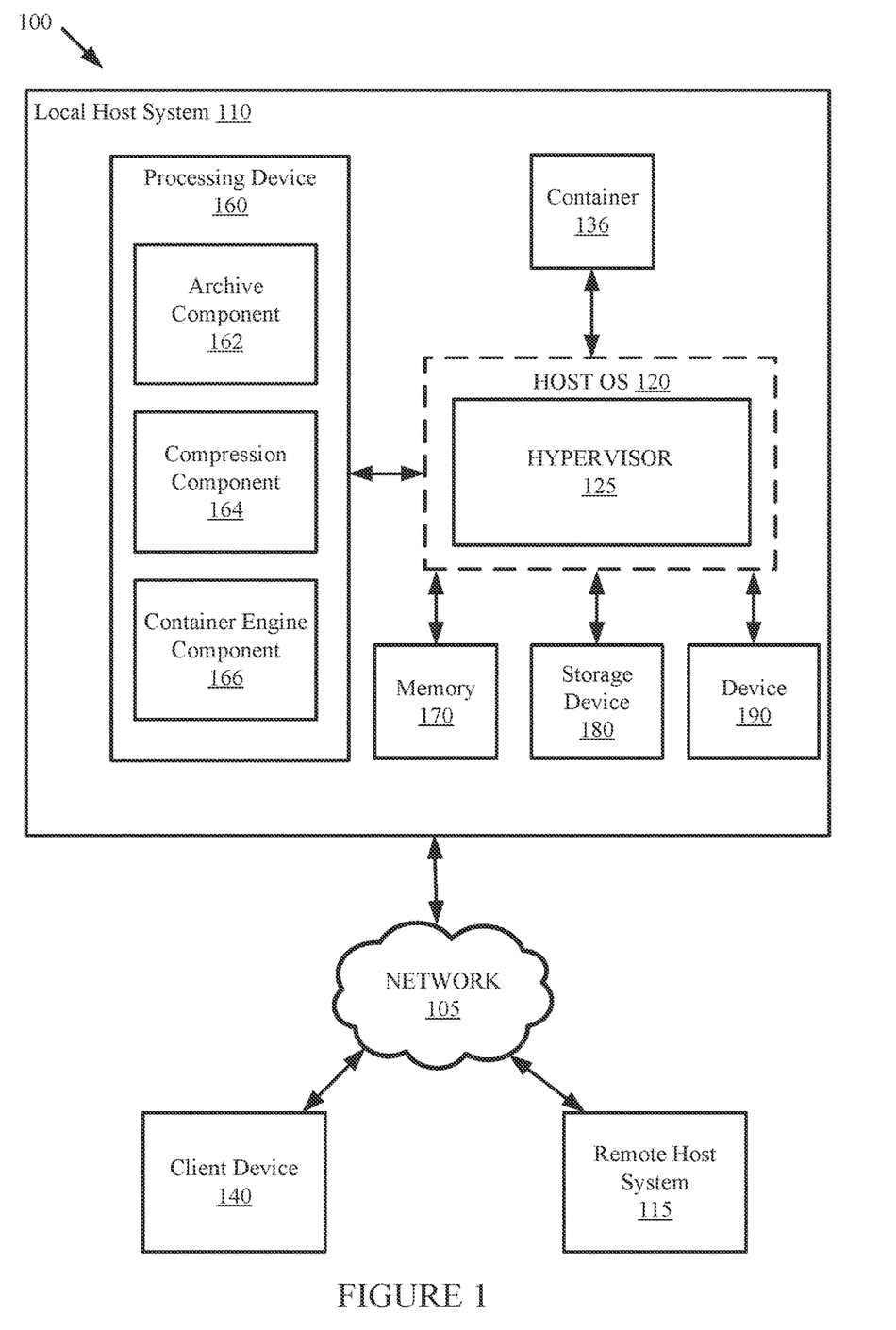
FIG. 1 depicts a high-level component diagram of an illustrative example of a computer system architecture, in accordance with one or more aspects of the present disclosure.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not limited to the specific architecture depicted by FIG. 1.

As shown in FIG. 1, computer system architecture 100 includes local host system 110, remote host system 115, and client device 140. The local host system 110, remote host system 115, and client device 140 include one or more processing devices 160, memory 170. The one or more processing devices 160 may be provided by one or more general-purpose processing devices such as a microprocessor, central processing unit, or the like. In an illustrative example, the one or more processing devices 160 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The one or more processing devices 160 may also comprise one or more special-purpose processing devices such as an application specific integrated circuit (ASIC), a field programmable gate array (FPGA), a digital signal processor (DSP), network processor, or the like.

The memory 170 may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be one or a combination of a cache memory system or a non-uniform access (NUMA) architecture, such that memory access time depends on the memory location relative to processing device 160. It should be noted that although, for simplicity, processing device 160, storage device 180, and device 190 are depicted in FIG. 1 as single devices, other embodiments local host system 110, remote host system 115, and client device 140 may include a plurality of processing devices, storage devices, and memory devices.

The local host system 110, remote host system 115, and client device 140 may be a server, a mainframe, a workstation, a personal computer (PC), a mobile phone, a palm-sized computing device, etc. In embodiments, local host system 110, remote host system 115, and client device 140 may be separate computing devices. In some embodiments, local host system 110, remote host system 115 and/or client device 140 may be implemented by a single computing device. For clarity, some components of client device 140 and remote host system 115 are not shown. Furthermore, although computer system architecture 100 is illustrated as having two host systems and a single client device, embodiments of the disclosure may utilize any number of host systems and any number of client devices.

Local host system 110 and remote host system 115 may additionally include one or more virtual machines (VMs) 130, one or more containers 136, and host operating system (OS) 120. VM 130 is a software implementation of a machine that executes programs as though it was an actual physical machine. Container 136 acts as isolated execution environments for different functions of applications, as previously described.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may include a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The local host system 110, remote host system 115, and client device 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of local host system 110, remote host system 115, and/or client device 140.

Figure 2A:
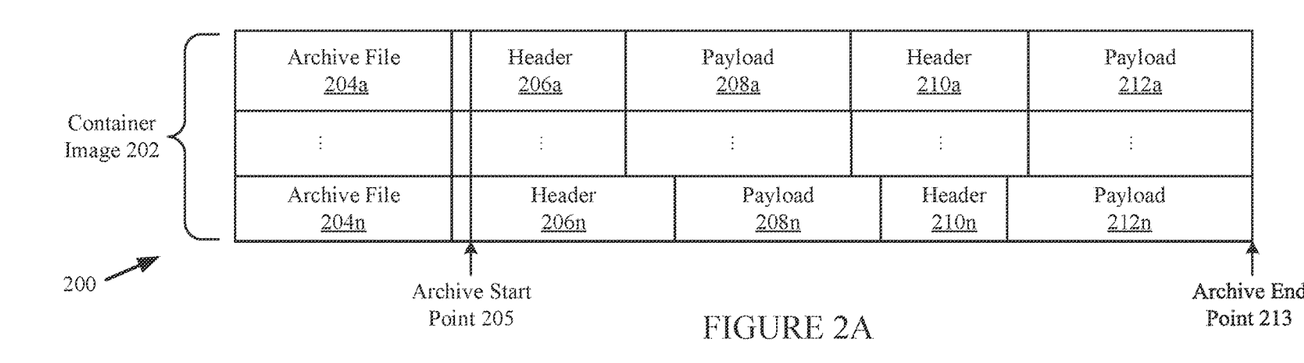
FIG. 2A is an illustration of a file that may include one or more files that may be segmented and compressed for storage and retrieval, in accordance with embodiments of the disclosure.
Figure 2B:
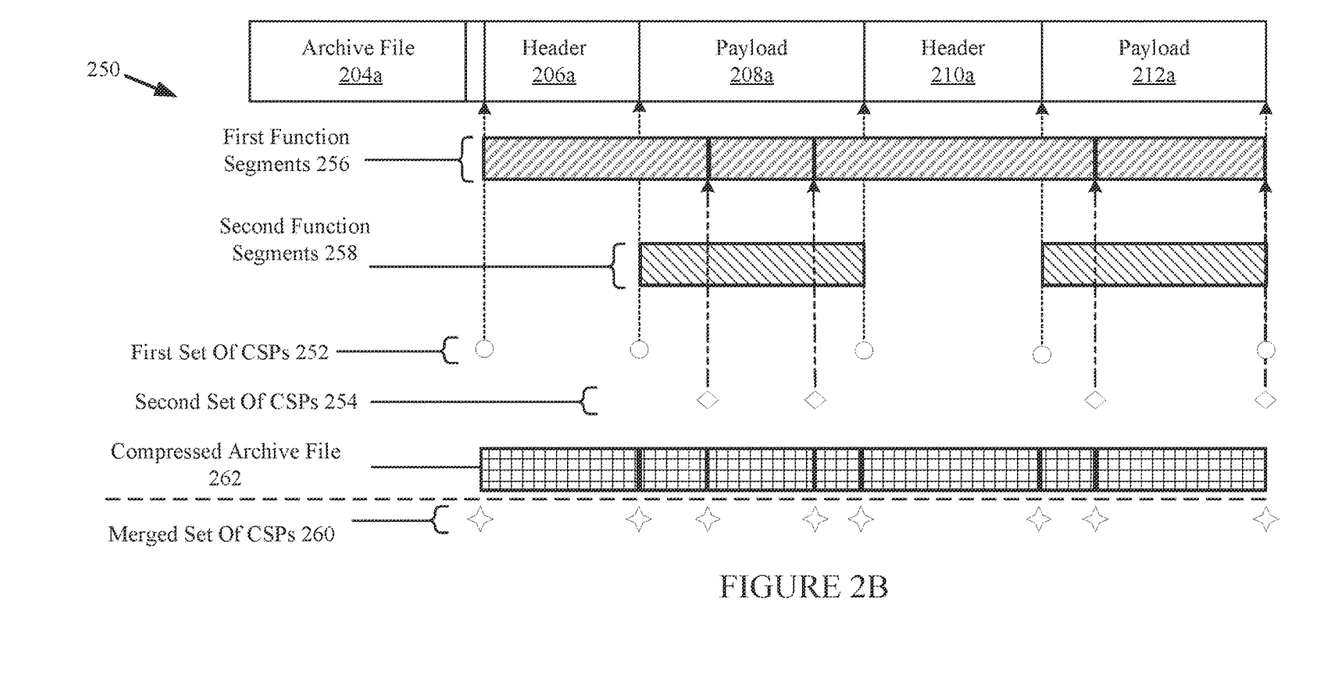
FIG. 2B is an illustration of an archive file, specifically, archive file that may be segmented according to one or more functions and compressed for storage and retrieval, in accordance with embodiments of the disclosure.

In an embodiment, an archive component 162 executed by processing device 160 may receive an archive file including an archive start point and an archive end point (e.g., see FIG. 2). The archive component 162 may create a first set of compression start points to segment the archive file according to a first function and a second set of compression start points to partition the archive file according to a second function. For example, the first function may provide for efficient local storage access and decompression and the second function more efficient access from network storage.

The archive component 162 may combine the first set of compression start points and the second set of compression start points to create a set of merged compression start points. The merged compression start points may be used by the archive component 162 to partition the archive file into portions between the archive start point and the archive end point. In an embodiment, a compression component 164 executed by processing device 160 may receive the merged compression start points defining each archive file portion and compress each portion between the archive start point and the archive end point to create a compressed archive file.

In embodiments, the compression component 164 may, for each compressed portion, generate a digest that may include, among other things, metadata corresponding to an offset associated with each merged start point. A container engine component 166 executed by processing device 160, in response to a request for a container image layer, may detect one or more missing portions of the archive file and retrieve those missing portions from the compressed archive file based on the digest. The container engine component 166 may add the retrieved one or more missing portions of the archive to a memory for future access. In an embodiment, the memory may be a local cache memory that may be a part of the memory 170.

FIG. 2A is an illustration of a file 200 that may include one or more files that may be segmented and compressed for storage and retrieval, in accordance with embodiments of the disclosure. In an embodiment, the file 200 may include a container image 202 that may include a multitude of container image layers, such as archive file 204a to archive file 204n. Each archive file, for example archive file 204a, may have an archive start point 205 and an archive end point 213 that defines the size of the archive file 204a. For simplicity, the archive start point 205 and the archive end point 213 are shown as being the same for each archive file 204a-n. However, in some embodiments, some archive files may have varying archive start points and archive end points.

Each archive file, such as archive file 204a and archive file 204n, include data. In an embodiment, the data are files, and each may have a different size and thus different file boundary locations between the archive start point 205 and the archive end point 213. For example, archive file 204a includes header 206a, payload 208a, header 210a, and payload 212a, and archive file 204n includes header 206n, payload 208n, header 210n, and payload 212n. In another embodiment, each file may be the same size and have the same boundary locations between the archive start point 205 and the archive end point 213.

FIG. 2B is an illustration of an archive file 250, specifically, archive file 204a that may be segmented according to one or more functions and compressed for storage and retrieval, in accordance with embodiments of the disclosure. For example, first function segments 256 may be defined by a first set of compression start points (CSPs) 252 created by processing (e.g., by processing device 160) the archive file 204a according to a first function, and second function segments 258 may be defined by a second set of compression start points (CSPs) 254 created by processing the archive file 204a according to a second function. A set of merged compression start points (CSPs) 260 to partition the archive file into portions between the archive start point and the archive end point are created by the processing and combining the first set of CSPs 252 and the second set of CSPs 254. In an embodiment, a first portion of the archive file is defined by a first merged compression start point and a corresponding adjacent merged start point, and the corresponding adjacent merged point is a compression start point for a second portion of the archive file adjacent to the first portion. The portions of data between each compression start point of the set of merged compression start points (CSPs) 260 are compressed to create a compressed archive file 262.

Figure 3:
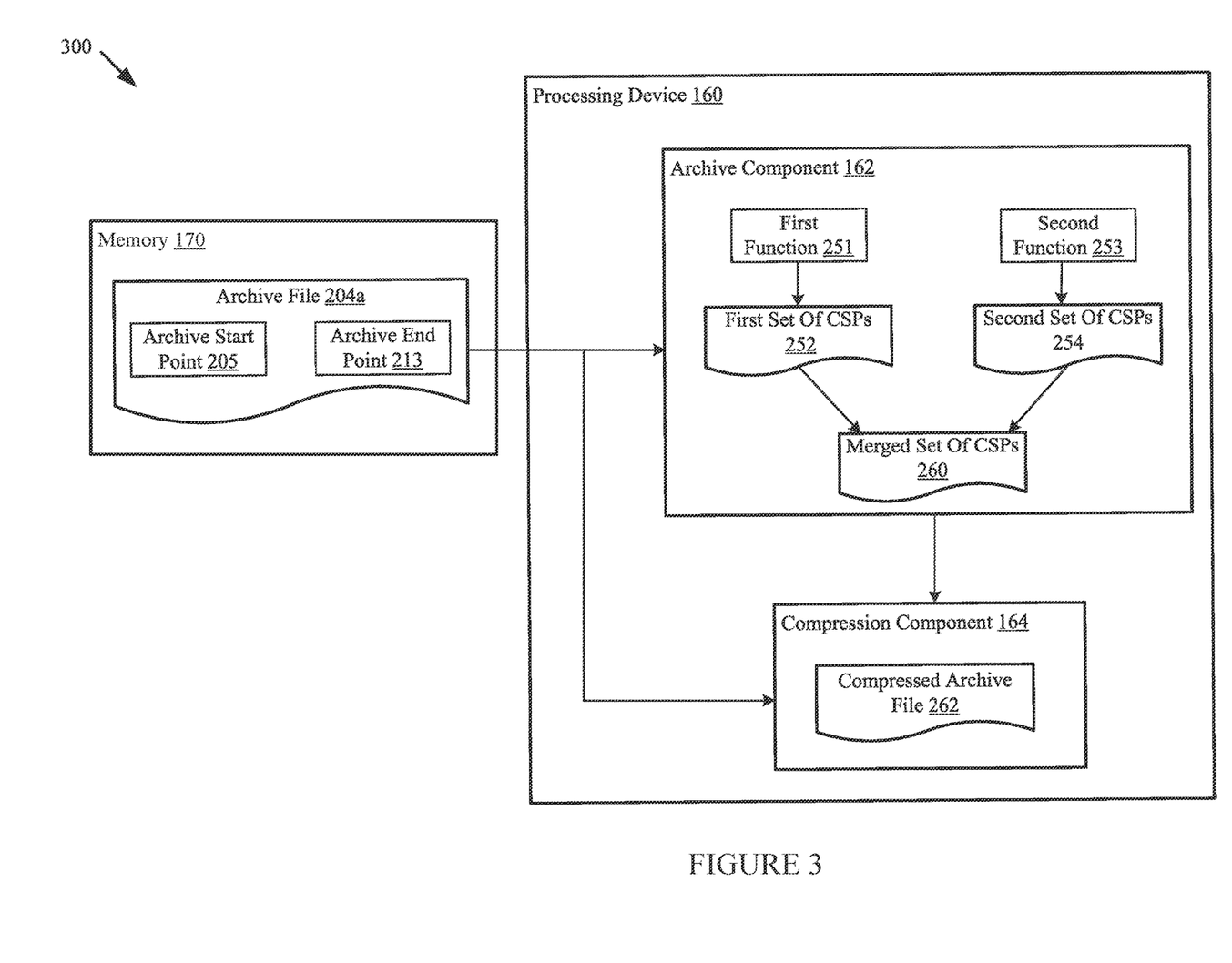
FIG. 3 is an illustration of a system including archive and compression components to segment a file and compressed it for storage and retrieval, in accordance with embodiments of the disclosure.

FIG. 3 is an illustration of a system 300 including archive and compression components to segment a file and compressed it for storage and retrieval, in accordance with embodiments of the disclosure. For example, the processing device 160 may include the archive component 162 that may receive archive file 204a. In embodiments, the archive file 204a may be stored in a repository in a local or remote location, for example, in the memory 170 (as shown), on the storage device 180, or remotely on the remote host system 115 and accessed over the network 105, as shown with respect to FIG. 1.

The archive component 162 may receive the archive file 204a from the memory 170 and segment the archive file 204a according the archive start point 205, the archive end point 213, the first function 251, and the second function 253 to create the first set of compression start points (CSPs) 252 and the second set of compression start points (CSPs) 254, respectively. The archive component 162 may combine the first set of CSPs 252 and the second set of CSPs 254 to create the set of merged compression start points (CSPs) 260. The set of merged CSPs 260 segment the archive file into portions between the archive start point 205 and the archive end point 213 as shown in FIG. 2, according to an embodiment. The compression component 164 compresses the portions of the archive file 204a based on the set of merged CSPs 260 to create the compressed archive file 262. In an embodiment, the compression component 164 may create a digest including metadata for at least the compressed archive file 262 and each compressed portion of the compressed archive file 262. Processing device 160 to segment and compress an image file layers, such as archive file 204a, improves system performance by reducing compute time and resources required to access those image file layers when requested by a system, such as local host system 110.

Figure 4:
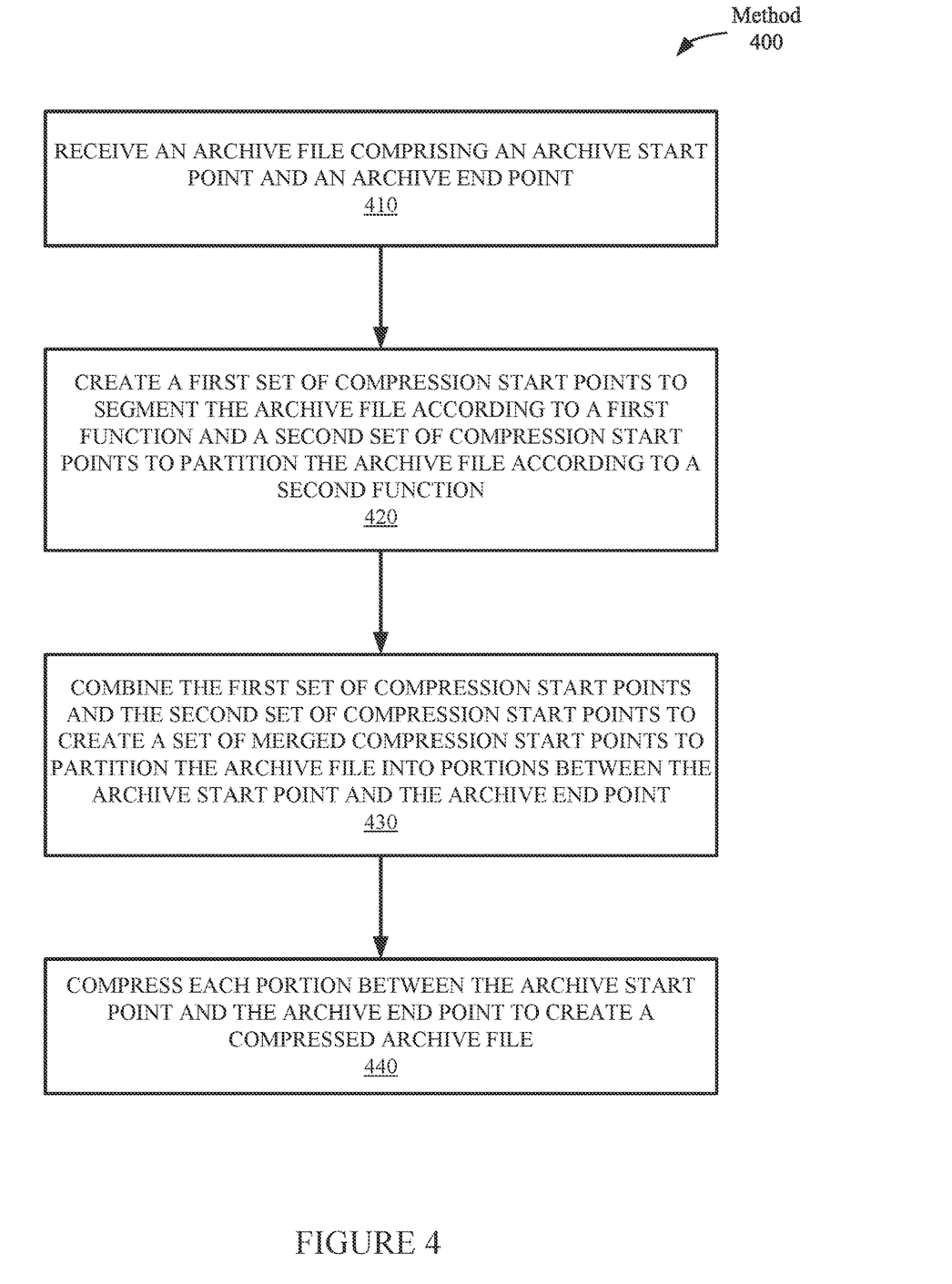
FIG. 4 is a flow diagram of a method of utilizing an archive component and compression component, in accordance with some embodiments.

FIG. 4 is a flow diagram of a method 400 of utilizing an archive component and compression component, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by archive component 162 and compression component 164 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic receives an archive file comprising an archive start point and an archive end point.

At block 420, the processing logic creates a first set of compression start points to segment the archive file according to a first function and a second set of compression start points to partition the archive file according to a second function.

At block 430, the processing logic combines the first set of compression start points and the second set of compression start points to create a set of merged compression start points to partition the archive file into portions between the archive start point and the archive end point.

At block 440, the processing logic compresses each portion between the archive start point and the archive end point to create a compressed archive file.

Figure 5:
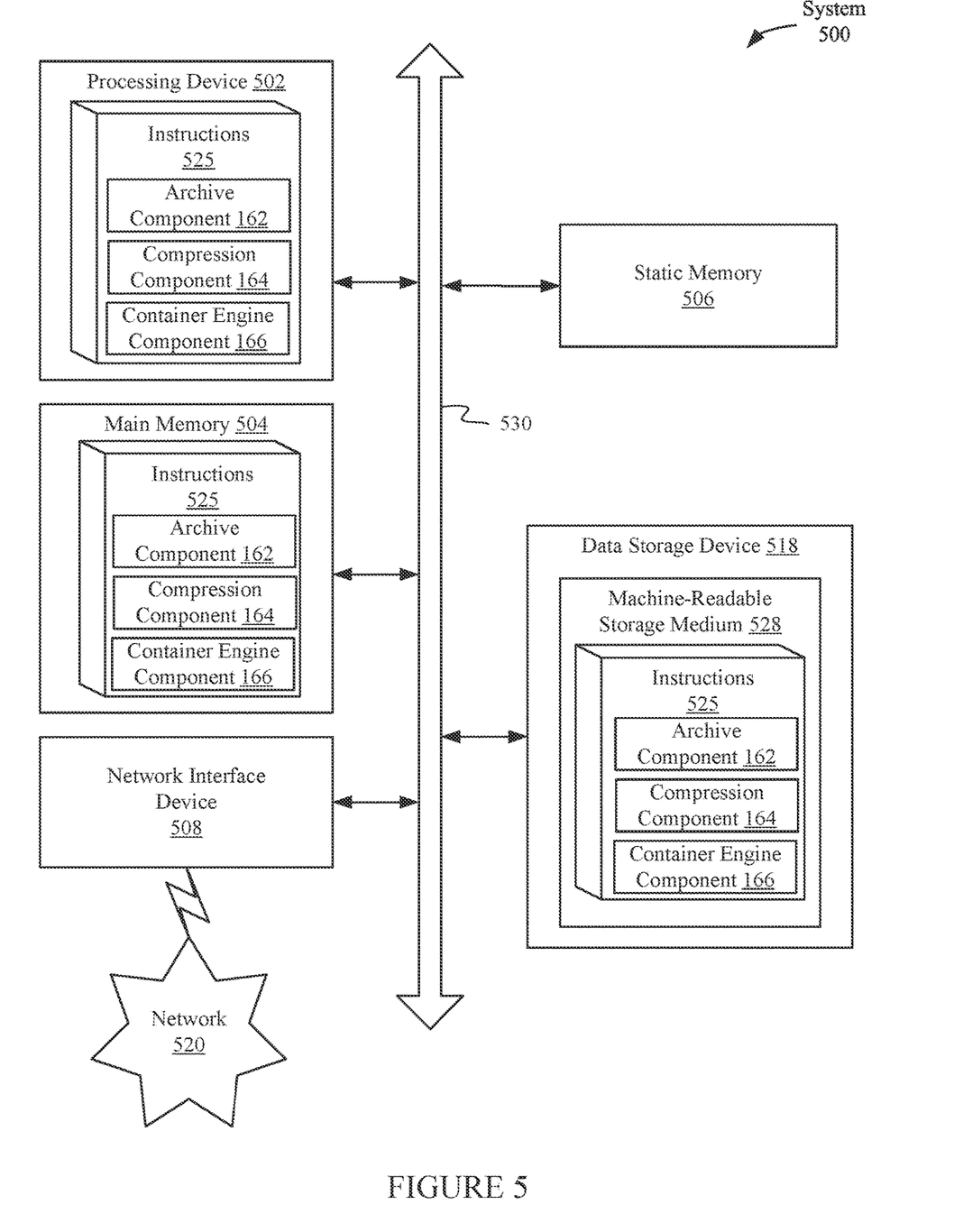
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory) and a data storage device 518, which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520.

Data storage device 518 may include a computer-readable storage medium 528 on which may be stored one or more sets of instructions 525 that may include instructions for an archive component, compression component and container engine component, e.g., archive component 162, compression component 164 and container engine component 166 for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "creating," "combining," "compressing," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a container image comprising a plurality of image layers, wherein a first image layer of the plurality of image layers comprises an archive file comprising an archive start point and an archive end point, wherein each of the plurality of image layers comprises a plurality of headers and a plurality of payloads;
   creating a first set of compression start points to segment the archive file into a plurality of first segments from the archive start point to the archive end point according to a first function and creating a second set of compression start points to partition the archive file into a plurality of second segments from the archive start point to the archive end point according to a second function, wherein the first function uses a rolling checksum algorithm to create the first set of compression start points that is different from an algorithm used by the second function to create the second set of compression start points,
   wherein a beginning and an end of each of the plurality of second segments are based on boundaries corresponding to a beginning and an end of a payload of the plurality of payloads, and
   wherein a first segment of the plurality of first segments spans at least two of the plurality of second segments and a second segment of the plurality of second segments spans at least two of the plurality of first segments;
   combining, by a processing device, the first set of compression start points and the second set of compression start points to create a set of merged compression start points to partition the archive file into portions between the archive start point and the archive end point;
   compressing each portion of the archive file between the archive start point and the archive end point to create a compressed archive file comprising compressed portions; and
   generating a digest comprising metadata for the compressed archive file and for each of the compressed portions of the compressed archive file, the metadata for each of the compressed portions of the compressed archive file corresponding to an offset associated with a merged compression start point of the set of merged compression start points.

2. The method of claim 1, wherein compressing each portion of the archive file further comprises:
   compressing a first portion of the archive file as defined by a first merged compression start point and a corresponding adjacent merged compression start point to create a first compressed portion of the compressed portions, wherein the corresponding adjacent merged compression start point is a compression start point for a second portion of the archive file adjacent to the first portion.

3. The method of claim 1 further comprising:
   receiving a request for the first image layer of the container image;
   detecting one or more missing portions of the archive file of the first image layer;
   retrieving the one or more missing portions of the archive file from the compressed archive file based on the digest of one or more of the compressed portions; and
   storing the retrieved one or more missing portions of the archive file to a memory.

4. A system comprising:
   a memory; and
   a processing device of a local host system, operatively coupled to the memory, to:
      receive a container image comprising a plurality of image layers, wherein a first image layer of the plurality of image layers comprises an archive file comprising an archive start point and an archive end point, wherein each of the plurality of image layers comprises a plurality of headers and a plurality of payloads;

create a first set of compression start points to segment the archive file into a plurality of first segments from the archive start point to the archive end point according to a first function and create a second set of compression start points to partition the archive file into a plurality of second segments from the archive start point to the archive end point according to a second function, wherein the first function uses a rolling checksum algorithm to create the first set of compression start points that is different from an algorithm used by the second function to create the second set of compression start points, wherein a beginning and an end of each of the plurality of second segments are based on boundaries corresponding to a beginning and an end of a payload of the plurality of payloads, and wherein a first segment of the plurality of first segments spans at least two of the plurality of second segments and a second segment of the plurality of second segments spans at least two of the plurality of first segments;

combine the first set of compression start points and the second set of compression start points to create a set of merged compression start points to partition the archive file into portions between the archive start point and the archive end point;

compress each portion between the archive start point and the archive end point to create a compressed archive file comprising compressed portions; and generate a digest comprising metadata for the compressed archive file and for each of the compressed portions of the compressed archive file, the metadata for each of the compressed portions of the compressed archive file corresponding to an offset associated with a merged compression start point of the set of merged compression start points.

5. The system of claim 4, wherein the processing device is further to:

compress a first portion of the archive file as defined by a first merged compression start point and a corresponding adjacent merged compression start point to create a first compressed portion of the compressed portions, wherein the corresponding adjacent merged compression start point is a compression start point for a second portion of the archive file adjacent to the first portion.

6. The system of claim 4, wherein the processing device is further to:

receive a request for the first image layer of the container image;

detect one or more missing portions of the archive file of the first image layer; and retrieve the one or more missing portions of the archive file from the compressed archive file based on the digest of one or more of the compressed portions.

7. A non-transitory computer-readable storage medium including instructions that, when executed by a processing device, cause the processing device to:

receive a container image comprising a plurality of image layers, wherein a first image layer of the plurality of image layers comprises an archive file comprising an archive start point and an archive end point, wherein each of the plurality of image layers comprises a plurality of headers and a plurality of payloads;

create a first set of compression start points to segment the archive file into a plurality of first segments from the archive start point to the archive end point according to a first function and create a second set of compression start points to partition the archive file into a plurality of second segments from the archive start point to the archive end point according to a second function, wherein the first function uses a rolling checksum algorithm to create the first set of compression start points that is different from an algorithm used by the second function to create the second set of compression start points, wherein a beginning and an end of each of the plurality of second segments are based on boundaries corresponding to a beginning and an end of a payload of the plurality of payloads, and wherein a first segment of the plurality of first segments spans at least two of the plurality of second segments and a second segment of the plurality of second segments spans at least two of the plurality of first segments;

combine the first set of compression start points and the second set of compression start points to create a set of merged compression start points to partition the archive file into portions between the archive start point and the archive end point;

compress each portion between the archive start point and the archive end point to create a compressed archive file comprising compressed portions; and generate a digest comprising metadata for the compressed archive file and for each of the compressed portions of the compressed archive file, the metadata for each of the compressed portions of the compressed archive file corresponding to an offset associated with a merged compression start point of the set of merged compression start points.

8. The non-transitory computer-readable storage medium of claim 7, wherein the processing device is further to:

compress a first portion of the archive file as defined by a first merged compression start point and a corresponding adjacent merged compression start point to create a first compressed portion of the compressed portions, wherein the corresponding adjacent merged compression start point is a compression start point for a second portion of the archive file adjacent to the first portion.

9. The non-transitory computer-readable storage medium of claim 7, wherein the processing device is further to:

receive a request for the first image layer of the container image;

detect one or more missing portions of the archive file of the first image layer; and retrieve the one or more missing portions of the archive file from the compressed archive file based on the digest of one or more of the compressed portions.

10. The method of claim 1, wherein the second function is a file-objects-storage algorithm function.

11. The method of claim 1, wherein each of the first set of compression start points align with an internal portion of one of the second segments.

12. The system of claim 4, wherein the second function is a file-objects-storage algorithm function.

13. The system of claim 4, wherein each of the first set of compression start points align with an internal portion of one of the second segments.

14. The non-transitory computer-readable storage medium of claim 7, wherein the second function is a file-objects-storage algorithm function.

15. The non-transitory computer-readable storage medium of claim 7, wherein each of the first set of compression start points align with an internal portion of one of the second segments.

\* \* \* \* \*